United States Patent [19]

Kyuma et al.

[11] Patent Number: 5,448,749
[45] Date of Patent: Sep. 5, 1995

[54] DATA PROCESSING APPARATUS WITH OPTICAL VECTOR MATRIX MULTIPLIER AND PERIPHERAL CIRCUITS

[75] Inventors: Kazuo Kyuma; Shuichi Tai; Masanobu Takahashi, all of Hyogo, Japan

[73] Assignee: Mitsubishi Denki Kabushiki Kaisha, Tokyo, Japan

[21] Appl. No.: 366,377

[22] Filed: Dec. 29, 1994

Related U.S. Application Data

[63] Continuation of Ser. No. 580,688, Sep. 11, 1990, abandoned.

[30] Foreign Application Priority Data

Nov. 22, 1989 [JP] Japan .................. 1-303628

[51] Int. Cl.⁶ ............................. G06G 7/16
[52] U.S. Cl. .................. 395/800; 364/845; 364/841; 364/937.4; 364/DIG. 2; 359/237
[58] Field of Search ............. 395/800; 364/845, 841; 359/237

[56] References Cited

U.S. PATENT DOCUMENTS

| | | | |
|---|---|---|---|
| 3,944,820 | 3/1976 | Stotts | 250/227.21 |
| 4,595,994 | 6/1986 | Verber et al. | 364/841 |
| 4,620,293 | 10/1986 | Schlunt et al. | 364/845 |
| 4,633,428 | 12/1986 | Byron | 364/841 |
| 4,747,069 | 5/1988 | Grinberg et al. | 364/807 |
| 4,815,027 | 3/1989 | Tokumitsu et al. | 364/841 |
| 4,948,212 | 8/1990 | Cheng et al. | 359/7 |
| 5,008,833 | 4/1991 | Agranat et al. | 395/25 |
| 5,099,448 | 3/1992 | Myers et al. | 364/841 |

*Primary Examiner*—Thomas G. Black
*Assistant Examiner*—Paul Harrity
*Attorney, Agent, or Firm*—Rothwell, Figg, Ernst & Kurz

[57] ABSTRACT

A data processing apparatus having one or more processors each comprising an optical vector matrix multiplier and its peripheral circuits mounted on a single semiconductor substrate, the multiple processors constituting a network. The components of the optical vector matrix multiplier may be divided on two semiconductor substrates so that light-borne data is exchanged therebetween. These arrangements provide a compact multi-function data processing apparatus adapted to deal flexibly with diverse computing problems.

5 Claims, 9 Drawing Sheets

DATA PROCESSING APPARATUS WITH OPTICAL VECTOR MATRIX MULTIPLIER AND PERIPHERAL CIRCUITS

This is a continuation of application Ser. No. 07/580,688, filed Sep. 11, 1990 now abandoned.

BACKGROUND OF THE INVENTION

1. Field of the Invention

The present invention relates to a data processing apparatus which integrates a neuro-computer for flexible data processing or a connection machine for multifunction data processing.

2. Description of the Prior Art

Figure 1:
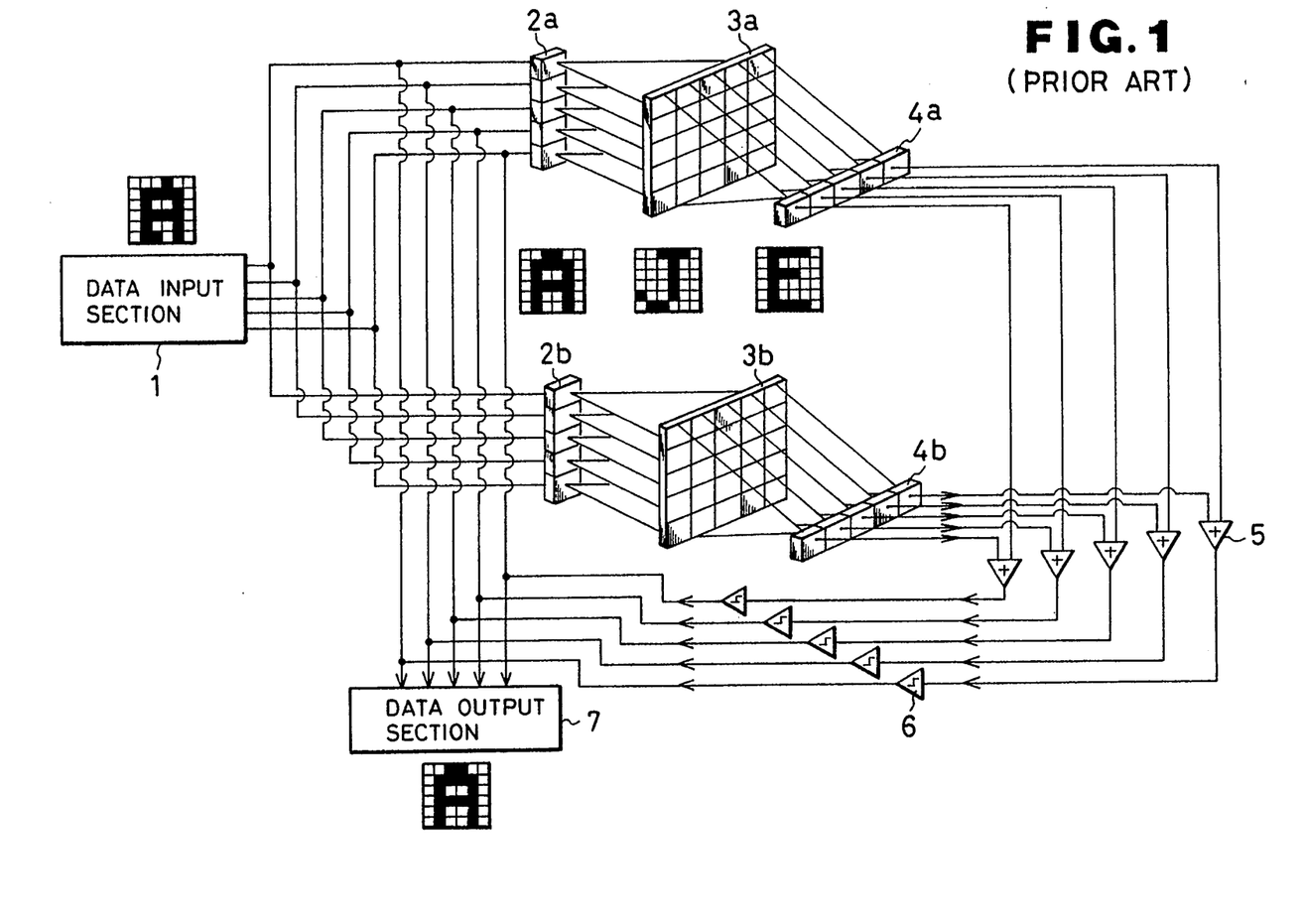
FIG. 1 is a view showing the construction of a typical prior art data processing apparatus.

FIG. 1 illustrates the construction of a prior art data processing apparatus such as one described in Photo- and Quantum-Electronics Study Group Material OQE87-174 (1988), pp. 39–45, Japan Society of Electronic Information Telecommunications. In FIG. 1, reference character 1 is a data input section that admits incomplete data; 2a (or 2b) is an LED (light-emitting diode) array whose elements correspond to the component pieces of the incomplete data; 3a (or 3b) is an optical mask having at least one piece of accumulated data in connection with each component of the incomplete data, the accumulated data being a collection of transmission factors; 4a (or 4b) is a light-receiving photodiode (PD) array whose elements correspond to the component pieces of the result of matrix computation with the optical mask 3a (or 3b); 5 is a differential amplifier that addresses the difference between the PD arrays 4a and 4b; 6 is a comparator that compares the output from the differential amplifier 5 with a threshold value; and 7 is a data output section that outputs complete data (i.e., corrected result of matrix computation).

In operation, the data input section 1 admits incomplete data and outputs it to the LED arrays 2a and 2b and to the data output section 7. After the output, the data input section 1 remains inactive until the next input of incomplete data. Each element of LED array 2a (or 2b) is turned ON or OFF according to the respective component pieces of the input data, EMITTING or NOT EMITTING a fan-shaped beam of light, as a component $V_j$ of an input vector $V$ ($=V_1, V_2, \ldots, V_j, \ldots, V_n$) corresponding to a 1 or 0 STATE of each LED array element, onto the optical mask 3a (or 3b).

The optical mask 3a (or 3b) has n by n elements constituting a matrix $T$ ($=T_{ij}$), each element having a different transmission factor. The output from the PD array 4a (or 4b) represents an output vector $U$ ($=U_1, U_2, \ldots, U_i, \ldots, U_n$) of the data that passed through the matrix T. The j-th LED of the LED array 2a (or 2b) illuminates the J-th row element of the optical mask 3a (or 3b). The light that passed through the i-th column element of the optical mask 3a (or 3b) is received by the i-th photodiode of the PD array 4a (or 4b). These processes make up the vector matrix computation expressed by the following equation:

$$U_i = \sum_j T_{ij} V_j \quad (1)$$

The so-called neuro-computer accumulates data in the connecting strengths between neurons, The above-mentioned prior art computer, which is an optical association type neuro-computer accumulates a plurality of pieces of past data in the transmission factor T of each element of the optical mask. The data is accumulated by the rule expressed by the following equation (2) based on the Hopfield model:

$$T_{ij} = \sum_s [2V_i(s) - 1][2V_j(s) - 1] \quad (2)$$

where, character "s" is the number of pieces of the accumulated data. In the neuro-computer, the value $T_{ij}$ may be positive or negative. However, since negative values cannot occur in optical terms, the optical system is divided into two portions, one addressing the positive component value $T_{ij}^{(+)}$ of the matrix $T_{ij}$ and the other dealing with the negative component value $T_{ij}^{(-)}$ thereof. (Hereafter, the positive value $T_{ij}^{(+)}$ is the transmission factor of the optical mask 3a, and the negative value $T_{ij}^{(-)}$ is that of the optical mask 3b.) In this manner, output vectors $U_i^{(+)}$ (of PD array 4a) and $U_i^{(-)}$ (of PD array 4b) are generated as the result of the matrix computation given by Eq. (1), and the difference between the vectors $$U_i = U_i^{(+)} - U_i^{(-)} \quad (3)$$

is obtained using the differential amplifier 5.

The output signal from the differential amplifier 5 is processed by the comparator 6 with respect to a threshold value, as expressed by the equation:

$$V_i' = \theta(U_i) \quad (4)$$

where, $$\theta(x) = \begin{cases} 1 & (x > 0) \\ 0 & (x \leq 0) \end{cases}$$

Thereafter, the new input vector $V_i'$ is fed back to the LED arrays 2a and 2b and is output to the data output section 7.

Illustratively, in the setup above, three pieces of data, say alphabetic characters A, J and E, may be accumulated beforehand in the optical masks 3a and 3b. When an incomplete piece of data, say A', is input to the LED arrays 2a and 2b, the internal feedback process is repeated and eventually yields data A, the closest to input data A', which is output for display as complete output data.

In other words, the energy of the system takes a minimum value with respect to accumulated data A, J and E, shown in FIG. 1. When the incomplete data is given, the whole system changes so that the nearest minimum value of its energy (i.e., the accumulated data closest to the incomplete data) is taken therein (by changing the illuminating status of the LED arrays 2a and 2b).

Because the prior art data processing apparatus is typically constructed as outlined above, electronic circuits such as the comparator need to be attached externally. This means that even single function equipment tends to be big in scale; multifunction apparatus that can deal flexibly with various problems are difficult to construct because of their huge physical dimensions.

SUMMARY OF THE INVENTION

It is therefore an object of the present invention to provide a data processing apparatus which is compact in scale and which has a wide range of functions for dealing flexibly with diverse kinds of problems.

In achieving the foregoing and other objects of the present invention and according to a first aspect thereof, there is provided a data processing apparatus which has one or more processors each comprising an optical vector matrix multiplier made up of layered components along with peripheral circuits, all mounted on a semiconductor substrate. The processors are interconnected via bus lines, or each optical vector matrix multiplier on the semiconductor substrate is connected via bus lines to one or more other devices so that one semiconductor substrate implements a wide range of functions for addressing various problems flexibly.

According to a second aspect of the present invention, there is provided a data processing apparatus which has appropriate circuits and PD arrays providing one or more functions. The back of the semiconductor substrate has surface emission semiconductor laser devices or LED arrays as well as spatial light modulators (SLM's) whereby light-borne data is transmitted from the back. Alternatively, that side of the semiconductor substrate which becomes permeable to the wavelength of the light used has appropriate circuits and PD arrays providing one or more functions, the same side also containing LED arrays and SLM's for transmitting light-born data toward the other side. These schemes are intended to transmit data between the semiconductor substrates configured.

The above and other related objects and features of the invention, as well as the novelty thereof, will clearly appear from the following description and from the accompanying drawings.

DETAILED DESCRIPTION OF THE PREFERRED EMBODIMENTS

Preferred embodiments of the present invention will now be described by referring to the accompanying drawings.

Figure 2:
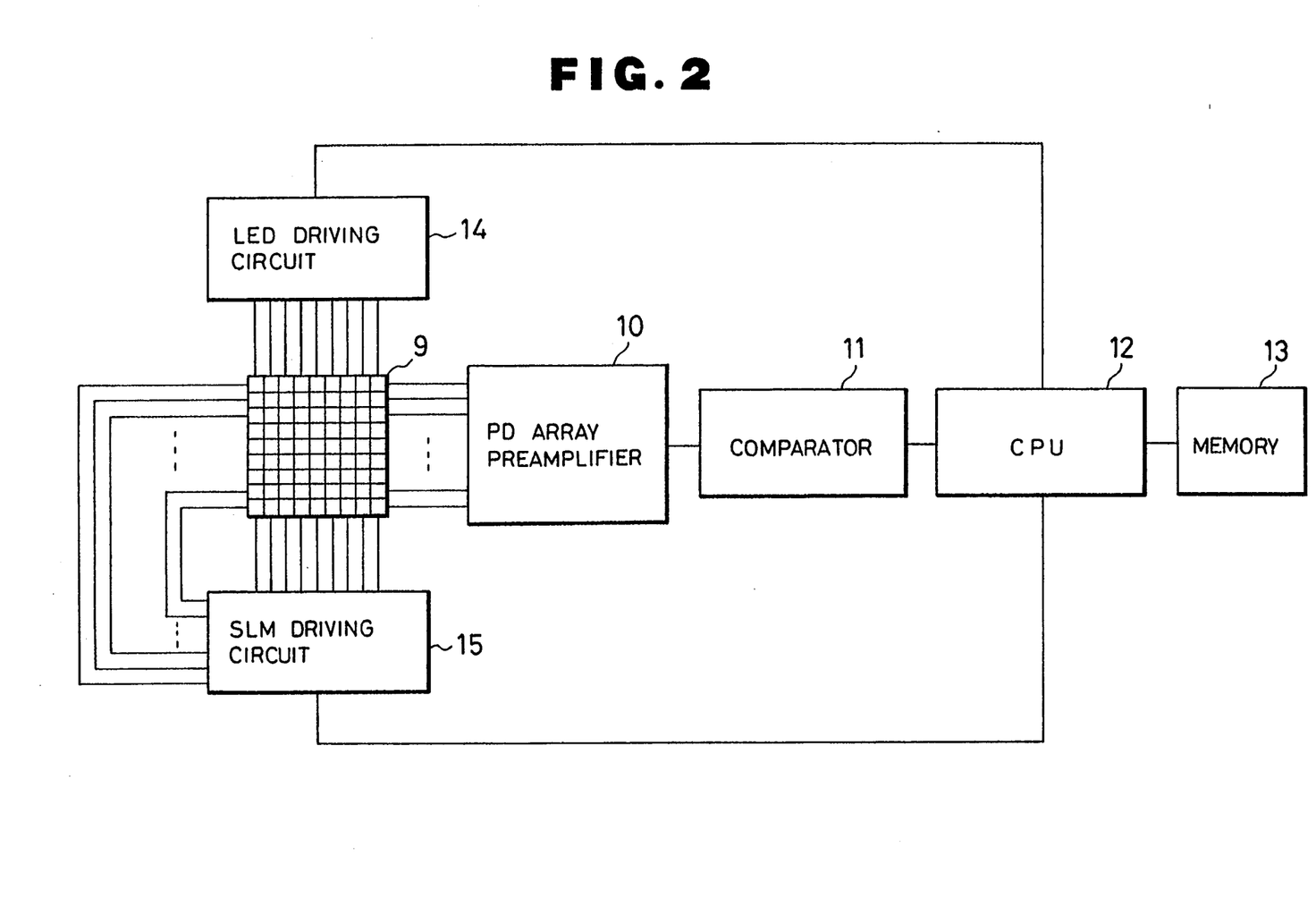
FIG. 2 is a block diagram of a processor for use with the present invention.

FIG. 2 shows in block diagram format how a processor 36 is constructed in a first embodiment of the invention. In FIG. 2, reference numeral 9 is an optical vector matrix multiplier of layered structure; 10 is a PD array preamplifier; 11 is a comparator that subjects the output from the PD array preamplifier to threshold value processing; 12 is a CPU that performs various computations and controls peripheral circuits; 13 is a memory; 14 is an LED driving circuit that drives the layered LED arrays in the optical vector matrix multiplier 9; and 15 is an SLM driving circuit that drives layered SLM arrays in the optical vector matrix multiplier 9. All the above parts are built on a semiconductor substrate 8 typically made up of a silicon wafer.

Figure 3:
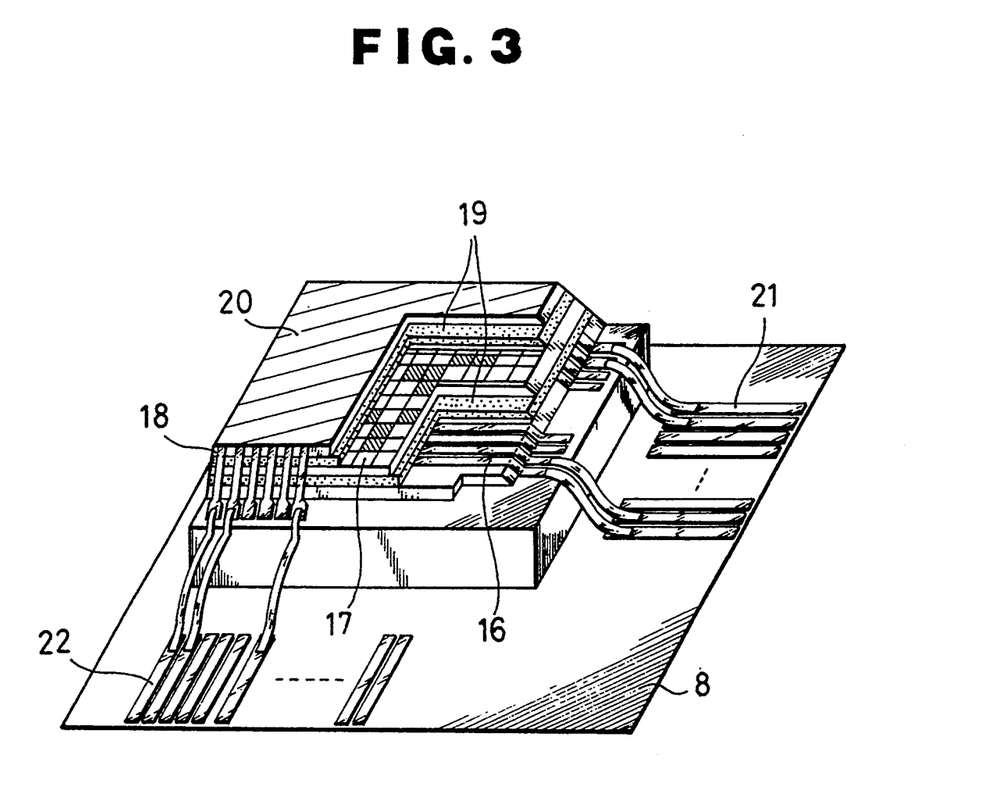
FIG. 3 is a perspective view showing a structure of an optical vector matrix multiplier for use with the invention.

FIG. 3 depicts in perspective how the optical vector matrix multiplier 9 of this invention is specifically constructed. In FIG. 3, reference numeral 16 is a PD array; 17 is an SLM array; 18 is an LED array; and 19 is a transparent insulation film. The PD array 16 is formed on the silicon wafer 8 (semiconductor substrate). On top of the PD array 16 is formed the SLM array 17 with placing a transparent insulating film 19 therebetween. Also, on top of the SLM array 17 is formed the LED array 18 made up of a GaAs-based material, another insulating film 19 being placed therebetween. These parts constitute a layered structure. Reference numeral 20 is an LED array grounding electrode; 21 is a set of PD array electrodes; and 22 is a set of LED electrodes.

Figure 4:
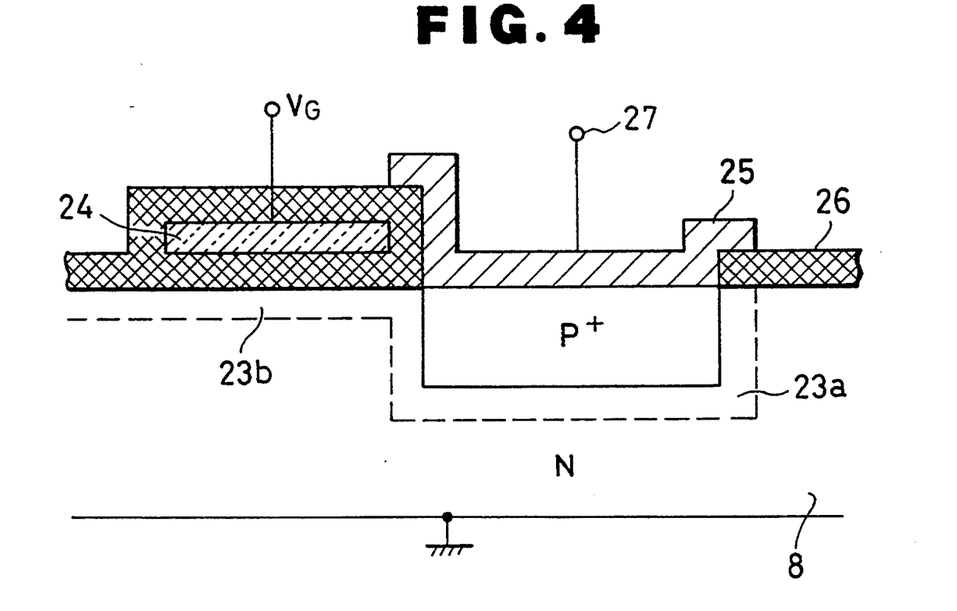
FIG. 4 is a view showing a typical construction of a light-receiving device whose detection sensitivity is variable for use with the invention.

FIG. 4 illustrates the construction of a PD device 28 which is variable in its detection sensitivity and which is used as the optical vector matrix multiplier 9. The PD device integrates a PN junction depletion layer 23a and an MOS gate depletion layer 23b composed of a metal 25, an oxide 26 and the semiconductor substrate 8. The MOS gate is illustratively made of poly-Si 24 which is a transparent substance, and the PN junction is covered with the metal electrode 25.

When incident light is admitted, a photoelectric current is generated in the depletion layer 23b under the MOS gate, and the PN junction collects the current. If the light-absorbing layer is longer than the depletion layer, only those electron-hole pairs generated in the depletion layer are converted to the photoelectric current; the electron-hole pairs generated outside the depletion layer are immediately recombined and do not contribute to the current. Therefore, the photoelectric current generated under the MOS gate is proportional in magnitude to the length of the depletion layer. Because the length of the depletion layer can be controlled by a gate voltage $V_G$, using the assembly as the PD device makes it possible to control its detection sensitivity with the gate voltage $V_G$.

Figure 5:
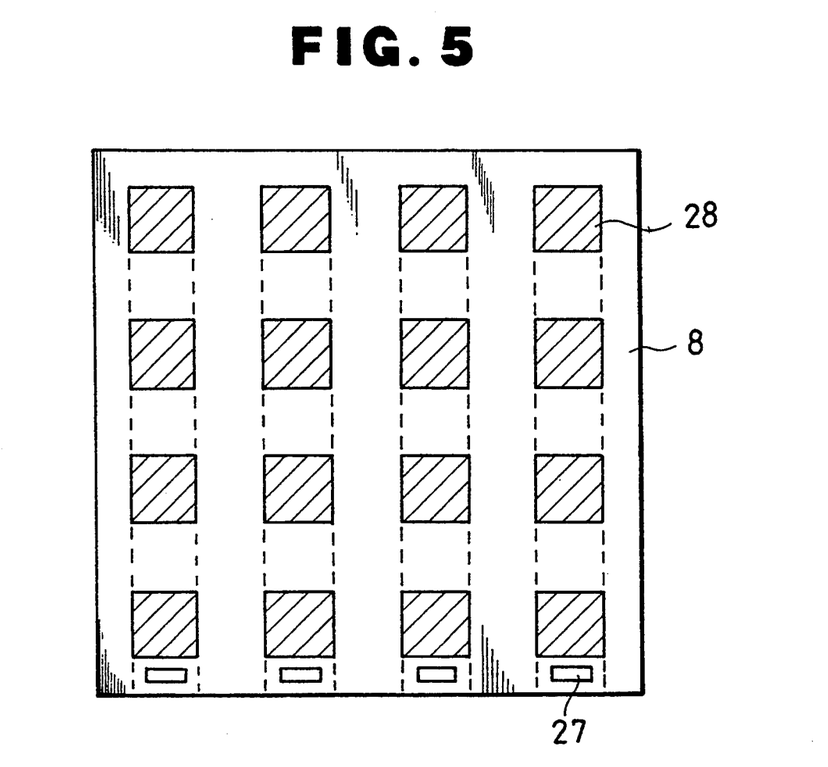
FIG. 5 is a view depicting a typical arrangement of the light-receiving device with variable detection sensitivity for use with the invention.

Arranging multiple PD devices 28 with their variable detection sensitivity in matrix as shown in FIG. 5 and placing the LED array 18 on top of the matrix, the vector matrix multiplier 9 can be constituted without using the SLM array 17. The PD devices 28 are disposed in array, while the MOS gates are arranged in matrix. Because photoelectric currents are added by the PD devices in array, adjusting the voltage applied to each MOS gate causes a photoelectric current weighted by the sensitivity of each PD device 28 to appear at a current output pad 27. Contained on one silicon substrate, these parts are conducive to easy integration together with peripheral circuits.

Figure 6:
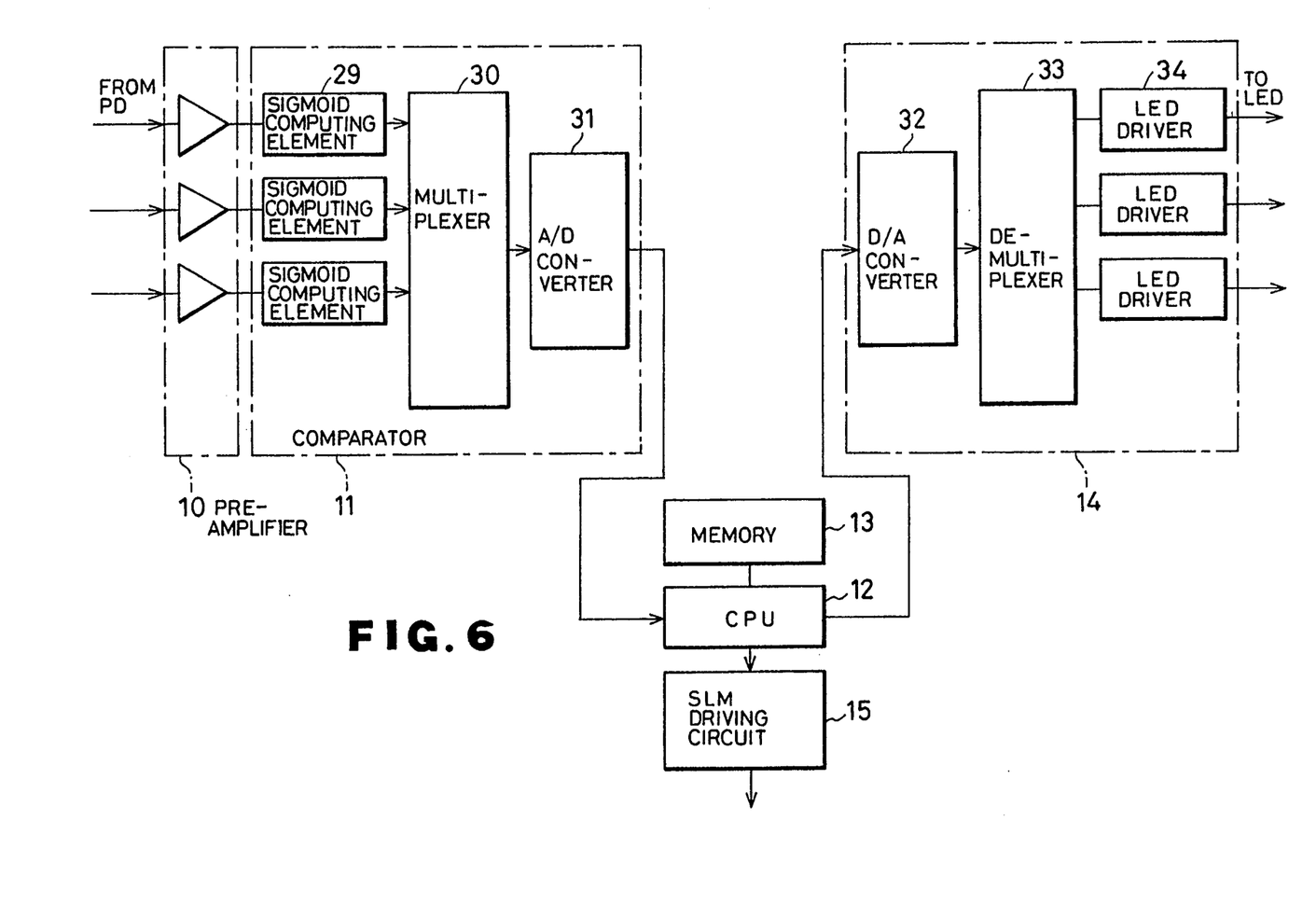
FIG. 6 is a block diagram showing how peripheral circuits of the processor of the invention are arranged.

FIG. 6 shows how the peripheral circuits are arranged on the semiconductor substrate 8. In FIG. 6, reference numeral 10 is the preamplifier for "n" PD arrays in parallel; 11 is the comparator that subjects parallel signals from the PD array preamplifier 10 to threshold value processing to output a serial signal; 12 is the CPU that performs appropriate computations on the output from the comparator 11; 13 is the memory; 14 is the LED driving circuit under control of the CPU 12; and 15 is the SLM driving circuit in control of the CPU 12. The comparator 11 comprises "n" sigmoid computing elements 29, a multiplexer 30 and an A/D converter 31. The sigmoid computing elements 29 subject, to sigmoid processing, the parallelly input signals from the PD array preamplifier 10. The multiplexer 30 converts the parallel signals from the sigmoid computing elements 29 into the serial signal. The A/D converter 31 converts the output from the multiplexer 30 to a digital signal that can be processed by the CPU 12. The LED driving circuit 14 comprises a D/A converter 32, a demultiplexer 33 and LED drivers 34. The D/A converter 32 converts the control signal from the CPU 12 to an analog signal. The demultiplexer 33 converts the serial signal from the D/A converter 32 into parallel signals. The LED driver 34 controls individual LED's in response to the output from the demultiplexer 33.

How the optical vector matrix multiplier 9 of FIG. 3 operates will now be described. When vector matrix computations are carried out by electronic circuits in a conventional setup, the computations are made successively on each of the components in the matrix. This means that the computations take a very long time when the matrix is large in scale. With this invention, the computations are carried out optically in the setup of FIG. 3 in which the long and narrow PD array 16 is formed on the silicon wafer, the PD array 16 being topped by the SLM array 17 representing the matrix W ($=W_{ij}$). The SLM array 17 expresses 1 or 0 for each of the components of the matrix W by means of transparency or nontransparency, respectively. On top of the SLM array 17 is placed the long and narrow LED array 18 perpendicular to the PD array 16. The LED array 18 being lit or extinguished corresponds to the component $V_j$ of an input vector V being 1 or 0, respectively. If the i-th PD array 16 yields an output $U_i$, the output is expressed as $$U_i = \sum_{j=1}^{N} W_{ij} V_j$$

where, $W_{ij}$ is a component of the matrix W, and N is the number of elements in the LED array 18. In this manner, optical vector matrix computations makes it possible to carry out huge amounts of computations in a very short time.

From a different point of view, the above-described function may be regarded as that of computations for connecting neurons in a neuro-computer. The matrix component $W_{ij}$ corresponds to the connecting strength between the i-th and the j-th neurons; a signal $V_j$ is the output from the j-th neuron, and a signal $U_i$ is the input to the i-th neuron. The signal $U_i$ is processed by a function such as the sigmoid function:

$$f(U_i) = 1/\{1+\exp(-U_i/T)\}$$

before transmission to the next neuron. In the equation above, T is a temperature parameter. The value of $f(U_i)$ varies depending on the parameter T. Such nonlinear processing is one of the most advantageous jobs for electronic circuits to deal with; this processing is thus carried out by the peripheral circuits provided on the silicon wafer.

The SLM array 17 of the optical vector matrix multiplier 9 is rewritable with external signals. The array may be implemented using a liquid crystal material, dielectric substance ($LiNbO_3$, PLZT, BSO single crystal, etc.), magnetic material such as a YIG thin film, or semiconductor (GaAs, InP, etc.) utilizing QCSE (quantum continement Stark effect) in multiple quantum wells.

In FIG. 6, the signal $U_i$ from the PD array 16 is amplified by the preamplifier 10 whose output is led to the sigmoid computing elements 29. The N signals from the computing elements 29 are processed by the multiplexer 30 in the next stage. The output from the multiplexer 30 is converted to a digital signal by the A/D converter 31. After being computed by the CPU 12, the output from the A/D converter 31 passes through the D/A converter 32 and demultiplexer 33 and reaches the LED driver 34 which turns on and off LED array elements as designated. The SLM driving circuit 15 uses the signal processed by the CPU 12 in order to rewrite the SLM array 17 or to control the sensitivity of the PD device of FIG. 4 whose detection sensitivity is variable.

Figure 7:
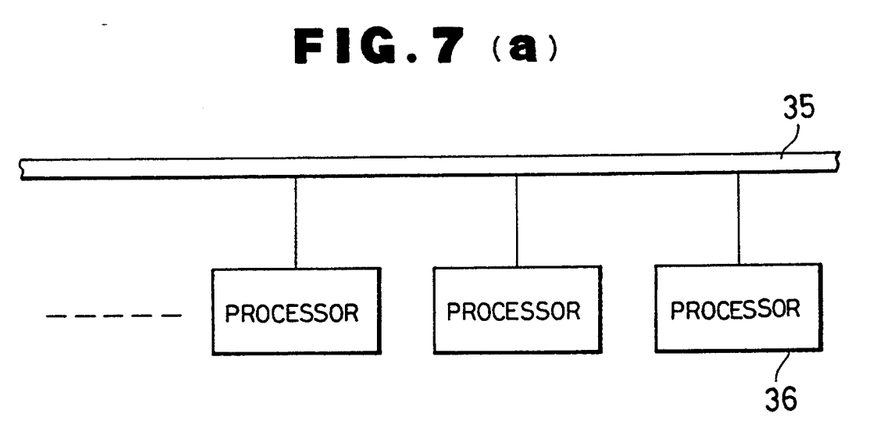
FIG. 7(a) is a block diagram of a plurality of processors embodying the present invention connected via a single bus line in accordance with the present invention.
FIG. 7(b) is a block diagram of a plurality of processors embodying the present invention connected to form a network in accordance with the present invention.

The data processing apparatus according to the invention has numerous optical vector matrix multipliers 9 offering the above-described functions as well as a large number of peripheral circuits, all integrated on a single silicon wafer. Various combinations of the apparatus provide diverse functional improvements. FIG. 7 shows examples of combined apparatus. FIG. 7 (a) depicts a combination of a plurality of processors 36 (FIG. 2) connected via a single bus line 35. FIG. 7 (b) illustrates numerous processors 36 combined to form a network, with only nearby processors interconnected. Each of these combinations may be implemented on one or more silicon wafers 8.

When the processors 36 are connected as in FIG. 7, they relate to one another in operation in a way that constitutes a complex, multifunction system.

Figure 8:
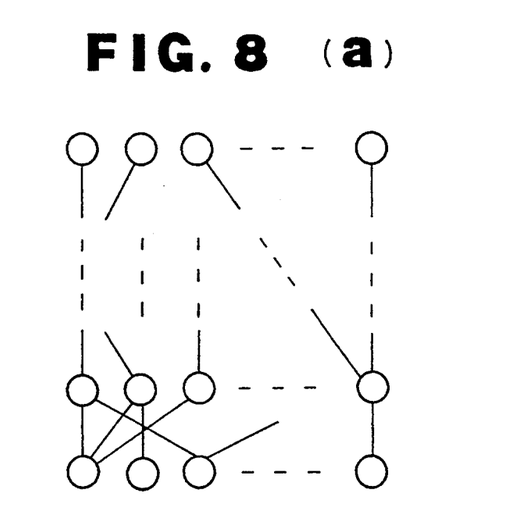
FIG. 8(a) is a diagram of processors of the present invention connected in a neural network in accordance with the present invention.
FIG. 8(b) is a diagram of processors of the present invention connected in a combination of neural networks of different kinds in accordance with the present invention.

FIG. 8 shows some examples of the multifunction system that may be implemented using the parts described above. FIG. 8 (a) depicts a multilayer neural network in which each connection of neurons is represented by the processor 36. FIG. 8 (b) is a combination of multiple neural networks of different kinds. This is an example of combining, among others, a feedback type network 37 with a feed forward type network 38 for improved functions.

Figure 9:
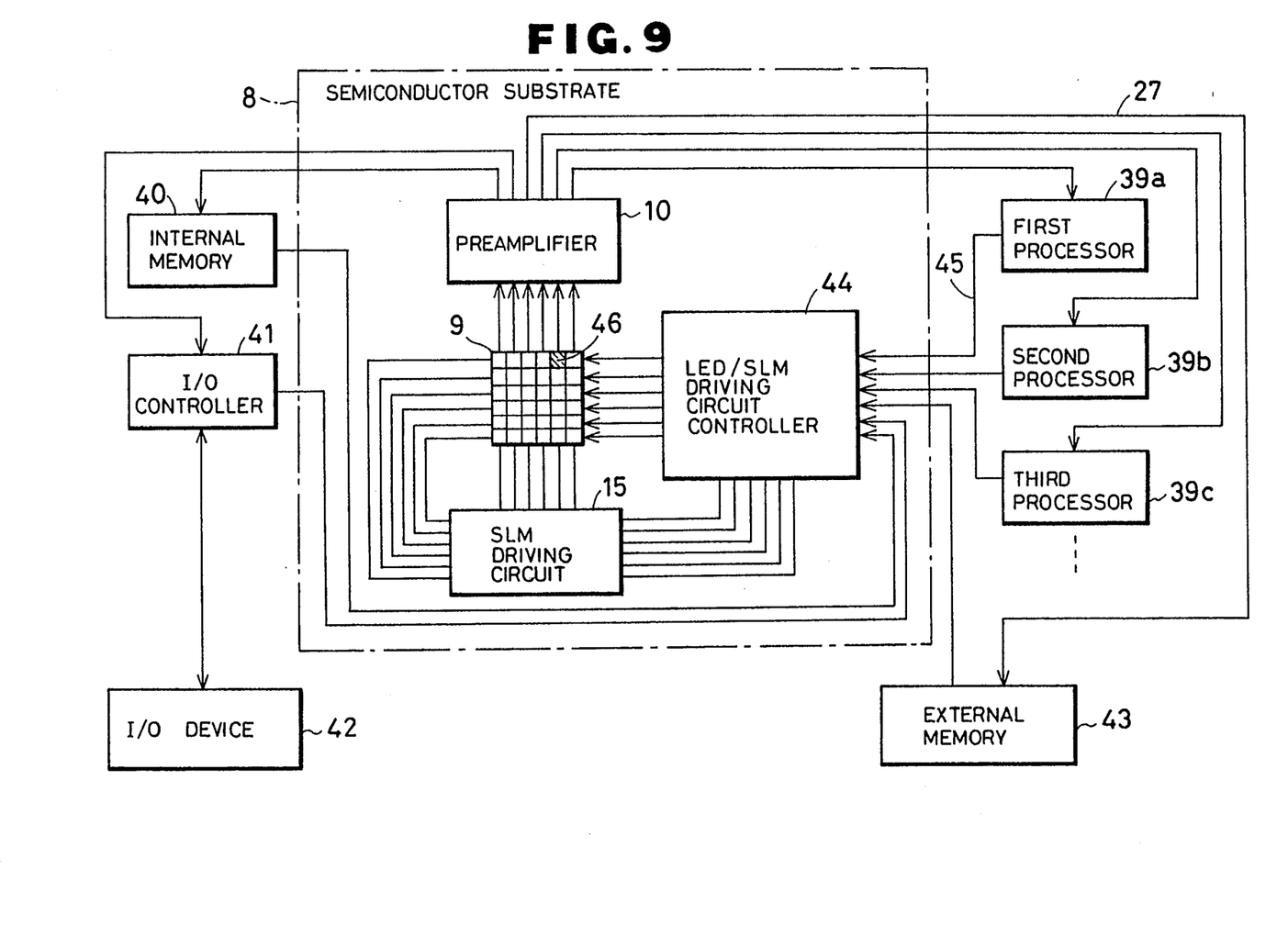
FIG. 9 is a view of a typical data communication system in which the optical vector matrix multiplier of the processor according to the invention is connected to a plurality of external devices for parallel and bidirectional data communication therebetween.

As shown in FIG. 9, the optical vector matrix multiplier 9 can also be used for communication between processors in a multiprocessor type computer. Where data is to be transmitted, say from a first processor 39a to a second processor 39b, an LED/SLM driving circuit controller 44 receives both a signal for specifying the second processor 39b as the data destination and the data to be transmitted, the signal being sent via the control line of control line-equipped bus lines 45, the data being forwarded over other bus lines.

The LED/SLM driving circuit controller 44 supplies the SLM driving circuit 15 with a signal for specifying an SLM array element 46 to be made transparent. The SLM driving circuit 15 in turn causes the designated element 46 to become transparent.

Of the LED arrays, the one that corresponds to the first processor 39a (i.e., LED array on the row where there is the SLM element 46 to be made transparent) is turned on by the LED/SLM driving circuit controller 44 when the transmitted data is a 1.

In this manner, the transmitted data is converted into the presence or absence of light. Of the PD arrays 16, the one that corresponds to the second processor 39b receives the light (i.e., PD array on the column where there is the SLM element to be made transparent). The light is subjected to photoelectric conversion to become a current. The current is then amplified by the PD array preamplifier 10 and the result is transmitted to the second processor 39b via the bus line 35.

Likewise, data is also transmitted and received bidirectionally between the processors 39a, 39b, 39c, ..., an internal memory 40, an I/O controller 41, and an external memory 43. Between different elements, say between first processor 39a and second processor 39b, and between internal memory 40 and external memory 43, data can be exchanged simultaneously.

There may be provided as many processors, internal memories and external memories as desired. Between all such processors, internal memories, external memories and I/O controller 41, data can be exchanged on a bidirectional basis.

Figure 10:
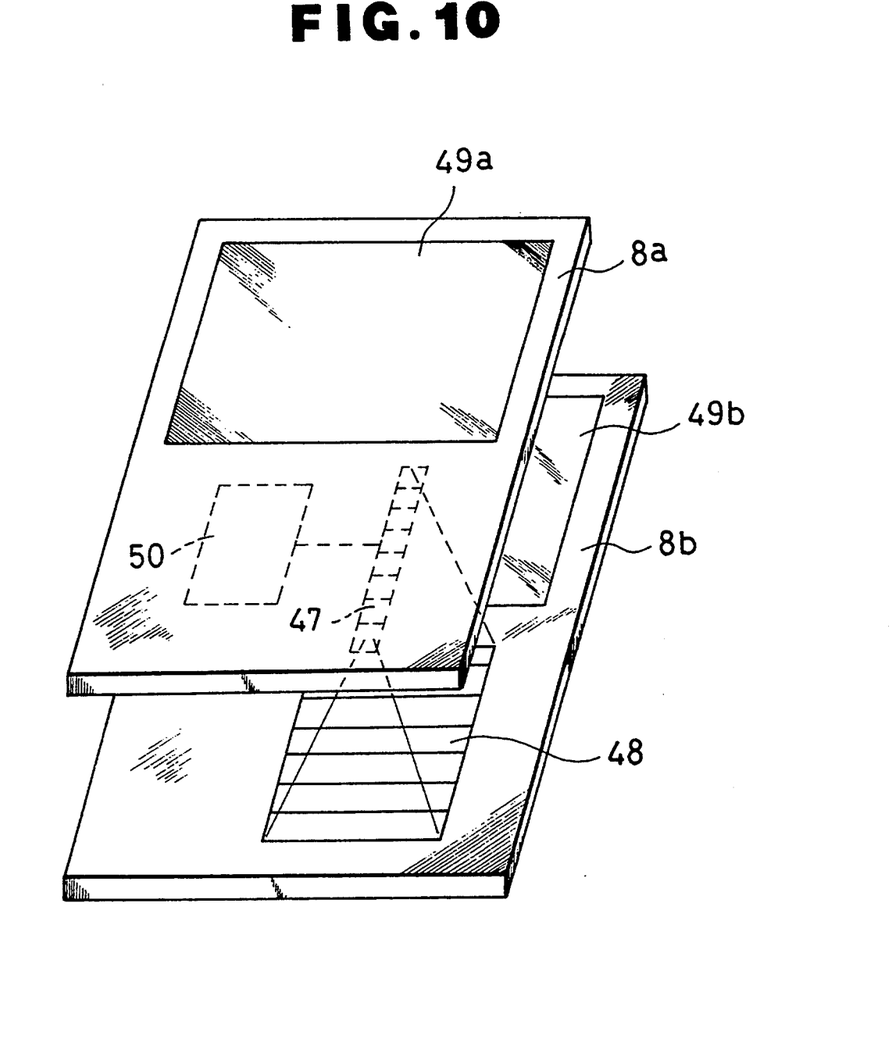
FIG. 10 is a view showing how data is transmitted between two semiconductor substrates.

Data can also be exchanged between different semiconductor substrates. FIG. 10 illustrates a case where data is exchanged between two semiconductor substrates 8a and 8b. One side of the first semiconductor substrate 8a contains a computing device 49a having such elements as the processors and memories described in connection with FIG. 9, and the other side of the substrate 8a comprises a surface emission semiconductor laser device array 47 and its driving circuit 50. A through-hole arrangement is illustratively used for signal transmission between the two sides. The second semiconductor substrate 8b comprises a PD array 48 and a computing device 49b. The two substrates exchange signals using the surface emission semiconductor laser device array 47 and the PD array 48.

Signals can also be exchanged between the two substrates by having the LED array 18 and SLM array 17 mounted on one substrate and the PD array 16 on the other, as illustrated. In this case, there should not be too much distance between the two substrates for effective data exchange.

In the embodiment described above, the semiconductor substrates are made of silicon. Alternatively, the substrates may be composed of such compound semiconductors as GaAs and InP. Also in the embodiment, analog and digital signals coexist in the peripheral circuits. Alternatively, all processing may be carried out by use of digital signals.

In the embodiment as depicted in FIG. 7, all components are operated on a concomitant basis. Alternatively, the components may be controlled individually under a time sharing scheme, different components doing different things at different times.

In the embodiment as illustrated in FIG. 10, the face and back of the semiconductor substrate have the laser device array 47 and the PD array 48, respectively. Alternatively, one side of the first semiconductor substrate may contain the peripheral circuits and the LED array, the side becoming transparent to the wavelength of light used. The light from the array may be allowed to go toward the back of the first substrate for data exchange with the PD array on the second substrate.

As indicated, the first aspect of the present invention involves one or more processors, each having a vector matrix multiplier and its peripheral circuits mounted on the same semiconductor substrate, the processors being interconnected or connected to other devices for data transmission. The second aspect of the invention involves performing data transmission between semiconductor substrates for implementing a wide range of functions on a compact scale, thereby building a large-scale multifunction system easily.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives modifications and variations as fall within the spirit and scope of the appended claims.

What is claimed is:

1. A data processing apparatus having at least one processor mounted and integrated on a first semiconductor substrate, said processor comprising:

an optical vector matrix array multiplier for performing vector matrix computations on an input signal having a light-receiving device array of variable detection sensitivity and photocurrents, said light receiving device array comprising;
  (a) first means forming a first depletion layer and including control means for controlling the length of said depletion layer in response to the magnitude of a control signal,
  (b) means for admitting light to impinge on said first depletion layer to generate electron-hole pairs in said first depletion layer which are converted to photocurrents proportional in magnitude to the length of said first depletion layer as controlled by said control signal and the intensity of the impinging light; and
  (c) second means forming a second depletion layer for collecting the photocurrents generated in said first depletion layer; whereby the magnitude of the photocurrents generated in said first depletion layer and collected in said second depletion layer is proportional to both the magnitude of the light impinging on said first depletion layer and the magnitude of said control signal;

a light-emitting device array positioned to emit light in a direction to be received by said light-receiving device array, said arrays and said matrix being formed in an integrated layered structure on said first semiconductor substrate; and a plurality of peripheral circuits integrally mounted on said first semiconductor substrate with said optical vector matrix array multiplier and including a preamplifier for use with said light-receiving device array, and a central processing unit (CPU) for signal processing and a memory, said peripheral circuits being integrally connected on said first semiconductor substrate to control said optical vector matrix array multiplier and to process output signals from said multiplier.

2. The data processing apparatus according to claim 1, wherein said optical vector matrix multiplier is connected via at least one bus line to a plurality of external devices including a processor, a memory and a data I/O device so that data is controlled for parallel and bidirectional exchange between said plurality of external devices.

3. The data processing apparatus according to claim 1 wherein, there being provided at least two processors, said plurality of processors are interconnected by at least one bus line to constitute a network.

4. The data processing apparatus according to claim 1, wherein said first semiconductor substrate is made of a silicon semiconductor substance.

5. The data processing apparatus according to claim 1, wherein said first semiconductor substrate is made of a compound semiconductor such as GaAs and InP.

* * * * *

UNITED STATES PATENT AND TRADEMARK OFFICE
CERTIFICATE OF CORRECTION

PATENT NO. : 5,448,749
DATED : September 5, 1995
INVENTOR(S) : Kazuo Kyuma et al.

It is certified that error appears in the above-indentified patent and that said Letters Patent is hereby corrected as shown below:

Col. 6, line 3, "Uis" should be -- $U_i$ is --.

Signed and Sealed this

Twenty-eighth Day of May, 1996

Attest:

BRUCE LEHMAN

*Attesting Officer*     *Commissioner of Patents and Trademarks*